United States Patent
Saito et al.

(10) Patent No.: US 12,469,647 B2
(45) Date of Patent: Nov. 11, 2025

(54) ELECTROLYTIC CAPACITOR

(71) Applicants: Panasonic Intellectual Property Management Co., Ltd., Osaka (JP); Sanyo Chemical Industries, Ltd., Kyoto (JP)

(72) Inventors: Kazuyo Saito, Osaka Fu (JP); Yuichiro Tsubaki, Kyoto Fu (JP); Tatsuji Aoyama, Kyoto Fu (JP); Kengo Uchihashi, Kyoto Fu (JP)

(73) Assignees: PANASONIC INTELLECTUAL PROPERTY MANAGEMENT CO., LTD., Osaka (JP); SANYO CHEMICAL INDUSTRIES, LTD., Kyoto (JP)

( * ) Notice: Subject to any disclaimer, the term of this patent is extended or adjusted under 35 U.S.C. 154(b) by 257 days.

(21) Appl. No.: 18/042,433

(22) PCT Filed: Jul. 21, 2021

(86) PCT No.: PCT/JP2021/027360
§ 371 (c)(1),
(2) Date: Feb. 21, 2023

(87) PCT Pub. No.: WO2022/044636
PCT Pub. Date: Mar. 3, 2022

(65) Prior Publication Data
US 2023/0360860 A1 Nov. 9, 2023

(30) Foreign Application Priority Data
Aug. 27, 2020 (JP) ................... 2020-143313

(51) Int. Cl.
*H01G 9/035* (2006.01)
*H01G 9/145* (2006.01)
(Continued)

(52) U.S. Cl.
CPC ............. *H01G 9/035* (2013.01); *H01G 9/145* (2013.01); *H01G 9/15* (2013.01); *H01G 9/028* (2013.01)

(58) Field of Classification Search
None
See application file for complete search history.

(56) References Cited

U.S. PATENT DOCUMENTS

2008/0316679 A1* 12/2008 Sugihara ............... H01G 9/145
361/504
2012/0300368 A1 11/2012 Matsuura et al.
(Continued)

FOREIGN PATENT DOCUMENTS

EP 3678152 A1 7/2020
JP 850-002054 B1 1/1975
(Continued)

OTHER PUBLICATIONS

Extended European Search Report dated Feb. 9, 2024 issued in the European Patent Application No. 21861064.0.
(Continued)

*Primary Examiner* — Eric W Thomas
(74) *Attorney, Agent, or Firm* — Rimon P.C.

(57) ABSTRACT

An electrolytic capacitor includes a capacitor element, and a liquid component. The capacitor element includes an anode body having a dielectric layer at a surface of the anode body, and a conductive polymer component covering part of the dielectric layer. The liquid component contains a first solvent, a base component, and an acid component. The first solvent is at least one selected from the group consisting of a polyol and a derivative thereof. The base component contains a first base which has no boiling point or a boiling point of 100° C. or higher. A conjugate acid of the first base has an acid dissociation constant of 5 or more and 10 or less.

21 Claims, 2 Drawing Sheets

(51) Int. Cl.
    *H01G 9/15*         (2006.01)
    *H01G 9/028*     (2006.01)

(56)         References Cited

U.S. PATENT DOCUMENTS

| | | |
|---|---|---|
| 2018/0119306 A1 * | 5/2018 | Tsubaki ................. H01G 9/145 |
| 2018/0233292 A1 | 8/2018 | Tsubaki et al. |
| 2020/0111622 A1 * | 4/2020 | Xiong ................... H01G 9/035 |
| 2021/0130628 A1 | 5/2021 | Araki et al. |
| 2021/0142952 A1 | 5/2021 | Sato et al. |
| 2022/0336160 A1 * | 10/2022 | Saito ..................... H01G 9/028 |
| 2022/0415579 A1 * | 12/2022 | Ishimaru ............. H01G 9/0036 |

FOREIGN PATENT DOCUMENTS

| | | | |
|---|---|---|---|
| JP | H03-091225 A | 4/1991 | |
| JP | H11-186108 A | 7/1999 | |
| JP | 2013-168636 A | 8/2013 | |
| JP | 2016-015365 A | 1/2016 | |
| JP | 2017-224646 A | 12/2017 | |
| JP | 2020-119916 A | 8/2020 | |
| WO | 2011/099261 A1 | 8/2011 | |
| WO | 2017/073062 A1 | 5/2017 | |
| WO | WO-2019049848 A1 * | 3/2019 | ............. H01G 9/028 |
| WO | 2020/017530 A1 | 1/2020 | |

OTHER PUBLICATIONS International Search Report dated Oct. 5, 2021 issued in International Patent Application No. PCT/JP2021/027360, with English translation.

* cited by examiner

ELECTROLYTIC CAPACITOR

CROSS REFERENCE TO RELATED APPLICATIONS

This application is the U.S. National Phase under 35 U.S.C. § 371 of International Patent Application No. PCT/JP2021/027360, filed on Jul. 21, 2021 which in turn claims the benefit of Japanese Patent Application No. 2020-143313, filed on Aug. 27, 2020, the entire disclosures of which Applications are incorporated by reference herein.

TECHNICAL FIELD

The present invention relates to an electrolytic capacitor including a conductive polymer compound.

BACKGROUND ART

As a capacitor which is small in size and large in capacitance and has a low ESR (equivalent series resistance), an electrolytic capacitor including an anode body having a dielectric layer, a conductive polymer covering at least part of the dielectric layer, and a liquid electrolyte is seen as promising. As the liquid electrolyte, a liquid component, such as a non-aqueous solvent, or a solution of a solute dissolved in a non-aqueous solvent, is used.

Patent Literature 1 proposes using for a liquid electrolyte in an electrolytic capacitor, a solvent, an acid, and a base having a base dissociation degree of 10 or more.

Patent Literature 2 proposes, as an electrolyte for an electrolytic capacitor to be impregnated into gaps in a solid electrolyte layer of a capacitor element, an electrolyte which is a salt of a cation of a basic compound and an anion of an acidic compound, and in which the pKa of a conjugate acid of the basic compound is 14.0 or less, and the boiling point of the basic compound is 90° C. or higher.

CITATION LIST

Patent Literature

[PTL 1] Japanese Laid-Open Patent Publication No. 2017-224646
[PTL 2] Japanese Laid-Open Patent Publication No. 2016-15365

SUMMARY OF INVENTION

Technical Problem

Electrolytic capacitors, depending on their application, are used in a high temperature environment in some cases. It has been expected in recent years to increase the allowable ripple current of electrolytic capacitors. When the ripple current is increased, the heat generation of the electrolytic capacitor increases, and the temperature of the electrolytic capacitor has a tendency to increase. Under such circumstances, there is a demand for further improvement in the heat resistance of electrolytic capacitors.

Solution to Problem

A first aspect of the present disclosure relates to an electrolytic capacitor, including:
a capacitor element; and a liquid component, wherein
the capacitor element includes an anode body having a dielectric layer at a surface of the anode body, and a conductive polymer component covering part of the dielectric layer,
the liquid component contains a first solvent, a base component, and an acid component,
the first solvent is at least one selected from the group consisting of a polyol and a derivative thereof, and
the base component contains a first base a conjugate acid of which has an acid dissociation constant of 5 or more and 10 or less and which has no boiling point or a boiling point of 100° C. or higher.

Advantageous Effects of Invention

An electrolytic capacitor excellent in heat resistance can be provided.

DESCRIPTION OF EMBODIMENTS

Electrolytic capacitors including a conductive polymer component, depending on their application, are used in a high temperature environment in some cases. Moreover, due to the heat generation caused by ripple current, the temperature of the electrolytic capacitor rises to be high in some cases. Therefore, excellent heat resistance is required for electrolytic capacitors. When the electrolytic capacitor is exposed to high temperatures, the dopant contained in the conductive polymer component is readily dedoped. When dedoping occurs, the electrical conductivity of the conductive polymer component decreases, and the ESR increases.

When the capacitor element of the electrolytic capacitor is impregnated with a liquid component containing an acid component and a base component, the layer repair performance of the dielectric layer can be improved to some extent, and the dedoping tends to be suppressed to some extent by the acid component. However, in a high temperature environment, the liquid component is easily volatilized, tending to be difficult to ensure sufficient layer repair performance, and moreover, the conductive polymer component is likely to come in contact with air, tending to lead to oxidative deterioration. Furthermore, in a high temperature environment, the concentration of the acid component tends to decrease in the liquid component due to its decomposition and the like, and dedoping of the dopant contained in the conductive polymer component becomes likely to occur. When oxidative deterioration of the conductive polymer or dedoping of the dopant occurs, the ESR increases. When, as the base component, one having a high boiling point is used, even in a high temperature environment, volatilization of the liquid component can be reduced to some extent. However, when the acid dissociation constant (pKa) of the conjugate acid of the base component is large, the base component readily reacts with the dopant contained in the conductive polymer component, and this accelerates the dedoping of the dopant. On the other hand, when the pKa of the conjugate acid of the base component is small, the dedoping can be reduced to some extent. However, since the degree of dissociation of the acid component contained in the liquid component has a tendency to decrease, the reduction in the layer repair performance tends to be accelerated. When the layer repair performance is reduced, the leakage current increases. As described above, especially in a high temperature environment, it is difficult to achieve both an excellent effect to suppress the oxidative deterioration and dedoping of the conductive polymer component and an excellent layer repair performance.

In the electrolytic capacitor according to the above aspect of the present disclosure, a liquid component is used which contains: a first solvent being at least one selected from the group consisting of a polyol and a derivative thereof; a base component including a first base a conjugate acid of which has a pKa of 5 or more and 10 or less and which has no boiling point or a boiling point of 100° C. or higher; and an acid component. Accordingly, even when the electrolytic capacitor is exposed to high temperatures, the volatilization of the liquid component is reduced. As a result, the oxidative deterioration of the conductive polymer component can be suppressed, and the dedoping from the conductive polymer component can be suppressed. Furthermore, excellent layer repair performance of the dielectric layer is ensured, and as a result, the thermal deterioration of the electrolytic capacitor can be suppressed. It is therefore possible to suppress an increase in the leakage current while suppressing an increase in ESR. In this way, according to the present disclosure, even when the electrolytic capacitor is exposed to high temperatures, the deterioration in performance of the electrolytic capacitor can be suppressed. Therefore, according to the present disclosure, an electrolytic capacitor having excellent heat resistance can be obtained. As understood from the above, especially, in a high temperature environment, for achieving both an excellent effect to suppress the oxidative deterioration and dedoping of the conductive polymer component and an excellent layer repair performance, it is important to control the pKa of the base component.

In the present specification, the acid dissociation constant (pKa) means an acid dissociation constant in water of a temperature of 25° C. The pKa of the conjugate acid of the base is the pKa of the cation of the base. When the conjugate acid of the base or the acid shows more than one pKa, the pKa means the highest pKa (i.e., $pKa_1$).

In the following, the electrolytic capacitor will be more specifically described.

[Electrolytic Capacitor]

The electrolytic capacitor includes a capacitor element and a liquid component.

(Liquid Component)

(Solvent)

(First Solvent)

The first solvent contained in the liquid component is at least one selected from the group consisting of a polyol and a derivative thereof. In view of ensuring more excellent layer repair performance, the polyol derivative preferably has a hydroxy group, and more preferably has two or more hydroxy groups. From a similar point of view, it is preferable to use a first solvent having two or more hydroxy groups. When using a first solvent having 3 or more or 4 or more hydroxy groups, the conductive polymer is likely to be oriented, and thus, the electrical conductivity can be enhanced.

The first solvent has a high polarity, and because of this, can readily dissolve the base component and the acid component and exhibits a high dielectric constant, and therefore, can ensure excellent ionic conductivity. The first solvent may be a protic solvent. The first solvent may be a solvent which, by itself, does not dissociate in the liquid component. The first solvent preferably has neither a heteroatom other than oxygen atom (e.g., sulfur atom, boron atom, phosphorus atom, and nitrogen atom) nor a carbonyl group.

Examples of the first solvent include a polyhydroxyalkane component, a polyalkylene glycol component, a glycerin component, and a sugar alcohol component.

As the polyhydroxyalkane component, for example, a polyhydroxyalkane component other than glycerin and sugar alcohols can be used. The polyhydroxyalkane component may be a di- or tri-hydroxyalkane component. Such a polyhydroxyalkane component include an alkylene glycol component, a trimethylolpropane, and the like. The alkylene glycol component includes, for example, a $C_{2-10}$ alkylene glycol, and is preferably a $C_{2-6}$ alkylene glycol, and, in particular, preferably a $C_{2-4}$ alkylene glycol (e.g., ethylene glycol, propylene glycol).

In the present specification, $C_{x-y}$ means that the number of carbon atoms is x or more and y or less. For example, a $C_{2-10}$ alkylene glycol means an alkylene glycol having 2 to 10 carbon atoms.

Among these, an alkylene glycol component, a polyalkylene glycol component, a glycerin component, a sugar alcohol component, and the like are preferable. With such a first solvent, when the electrolytic capacitor is exposed to high temperatures, the volatilization of the liquid component is suppressed, and more excellent layer repair performance is likely to be ensured. In view of obtaining further more excellent layer repair performance, a polyalkylene glycol component, a glycerin component, a sugar alcohol component, and the like are more preferable. The sugar alcohol component includes a sugar alcohol having four or more hydroxy groups, and a derivative of such a sugar alcohol.

As the first solvent, it is preferable to use at least a polyalkylene glycol component, and more preferable to use at least a polyalkylene glycol component having a weight average molecular weight of 150 or more. As the first solvent, a polyalkylene glycol component (solvent 1A) and a first solvent other than the solvent 1A (solvent 1B) may be used in combination. The solvent 1B is specifically exemplified by at least one selected from the group consisting of a polyhydroxyalkane component (e.g., alkylene glycol component, trimethylolpropane), a glycerin component, and a sugar alcohol component. When, as the first solvent, a polyalkylene glycol component having a weight average molecular weight of 150 or more is used, the alkylene glycol component of the solvent 1B that may be used includes, for example, a polyalkylene glycol component having a weight average molecular weight of less than 150 (e.g., diethylene glycol, triethylene glycol, dipropylene glycol). The first solvent may include the solvent 1B singly or in combination of two or more kinds.

When the solvent 1B is combined with the solvent 1A, the effect of suppressing the volatilization of the liquid component is enhanced, and therefore, the contact of the conductive polymer with air is suppressed, and the oxidative deterioration of the conductive polymer can be suppressed. As a result, even when the electrolytic capacitor is exposed to high temperatures, an increase in ESR can be suppressed.

When at least one of a glycerin component and a sugar alcohol component is used, the viscosity of the liquid component has a tendency to increase. In the case of using these components, by using in combination with a polyalkylene glycol component, the viscosity of the liquid component can be kept relatively low. Therefore, high dissociation of the acid component and the base component is likely to be ensured, and more excellent layer repair performance of the dielectric layer is likely to be ensured.

The proportion of the solvent 1A in the first solvent is, for example, preferably 90 mass % or more, and may be 95 mass % or more or 99 mass % or more. The proportion of the solvent 1A is 100 mass % or less. The first solvent may be constituted only of the solvent 1A.

Of the first solvent, as the polyalkylene glycol component, for example, a polyalkylene glycol component having a repeating structure of an alkylene oxide can be used. The alkylene oxide includes, for example, a $C_{2-4}$ alkylene oxide, and may be a $C_{2-3}$ alkylene oxide. Specific examples of the alkylene oxide include ethylene oxide, propylene oxide, trimethylene oxide, and butylene oxide. The polyalkylene glycol component may contain one kind of alkylene oxide unit, and may contain two or more kinds of alkylene oxide units. The polyalkylene glycol component containing two or more kinds of alkylene oxide units may contain, for example, an ethylene oxide unit and a $C_{3-4}$ alkylene oxide unit. When a polyalkylene glycol component containing two or more kinds of alkylene oxide units is used, the effect of reducing the viscosity of the liquid component is enhanced.

Examples of the polyalkylene glycol component include polyalkylene glycol, a copolymer having two or more kinds of alkylene oxide units, and a polyalkylene oxide adduct of a polyhydric alcohol. The polyhydric alcohol includes, for example, glycerin, trimethylolpropane, and a sugar alcohol. The sugar alcohol may be, for example, a sugar alcohol having four or more hydroxy groups (e.g., monosaccharide alcohol, disaccharide alcohol). Examples of the sugar alcohol include sorbitol, mannitol, erythritol, pentaerythritol, threitol, arabinitol, ribitol, xylitol, galactitol, rhamnitol, isomaltose, maltitol, lactitol, palatinose, and reduced forms of these (e.g., reduced palatinose). In the polyalkylene oxide adduct, two or more polyalkylene oxide chains may be the same polyalkylene oxide chain, or all the polyalkylene oxide chains may be different.

The liquid component may contain one kind of polyalkylene glycol component, and may contain two or more kinds of polyalkylene glycol components.

The weight average molecular weight (Mw) of the polyalkylene glycol component (or solvent 1A) is, for example, 150 or more, preferably 200 or more. Especially, regarding the polyalkylene glycol, in view of ensuring more excellent layer repair performance, the Mw is preferably 150 or more, more preferably 200 or more, Also, a polyalkylene glycol component with an Mw of 150 or more (preferably 200 or more) and a polyalkylene glycol component with an Mw of less than 150 (or less than 200) may be used in combination. The Mw is, for example, 20,000 or less, may be 10,000 or less or 5000 or less, or may be 2,000 or less or 1,000 or less. When the Mw is within such a range, the effect of suppressing the volatilization of the liquid component can be enhanced. Furthermore, since the viscosity of the liquid component can be easily kept relatively low, the dissociation of the acid component and the base component can be enhanced, and the effect of suppressing the dedoping can be enhanced, and also, excellent electrical conductivity is likely to be ensured. These lower and upper limits can be combined in any combination.

In the present specification, the weight average molecular weight (Mw) is a value based on polystyrene as measured by gel permeation chromatography (GPC). The GPC is usually measured using a polystyrene gel column, and water/methanol (volume ratio: 8/2) as a mobile phase.

The content of the solvent 1A in the liquid component is, for example, 30 mass % or more, preferably 50 mass % or more, or 60 mass % or more. In this case, the effect of reducing the volatilization of the liquid component is enhanced, and more excellent layer repair performance is likely to be obtained. Also, the viscosity of the liquid component can be kept low even when used in combination with the solvent 1B. The content of the solvent 1A in the liquid component is, for example, 95 mass % or less, preferably 90 mass % or less, and may be 85 mass % or less, 80 mass % or less, 75 mass % or less, or 70 mass % or less. In this case, even when the electrolytic capacitor is used in a high temperature environment, the thermal deterioration of the electrolytic capacitor can be suppressed more effectively. These lower and upper limits can be combined in any combination.

As the glycerin component, glycerin, a glycerin derivative, polyglycerin, a polyglycerin derivative, and the like can be used. The liquid component may contain one kind of glycerin component, or two or more kinds of glycerin components.

The polyglycerin includes a structure of repeating glycerin units. The number of repeating glycerin units included in the polyglycerin is, for example, 2 or more and 20 or less, may be 2 or more and 12 or less, or 2 or more and less than 12, and may be 2 or more and 10 or less, or 2 or more and 6 or less. As the polyglycerin, diglycerin, triglycerin, and the like are also preferable.

The derivative of glycerin or polyglycerin includes, for example, an ester in which at least part of the hydroxy groups of glycerin or polyglycerin are esterified, and an alkylene oxide adduct of glycerin or polyglycerin. The ester is exemplified, for example, by an organic acid ester (e.g., acetic acid ester). The alkylene oxide adduct is exemplified, specifically, by an adduct in which, for at least part of the hydroxy groups, one molecule of alkylene oxide is added to one hydroxy group. The alkylene oxide may be, for example, a $C_{2-4}$ alkylene oxide, and is preferably a $C_{2-3}$ alkylene oxide or an ethylene oxide. When the alkylene oxide adduct contains a plurality of alkylene oxide units, at least two of the alkylene oxide units may be of the same kind, or all of the alkylene oxide units may be of different kinds.

The number of the hydroxy groups in the derivative is not limited. The derivative may have no hydroxy group. The number of the hydroxy groups in the derivative may be, for example, 0 (zero) to 10, 0 (zero) to 8, 1 to 8, or 2 to 8.

In view of facilitating the orientation of the conductive polymer, it is preferable to use a glycerin component having a hydroxy group on each of at least two carbon atoms adjacent to each other. As the derivative, an alkylene oxide adduct is preferable. These glycerin components can readily swell the conductive polymer, and can readily facilitate the orientation of the conductive polymer. Therefore, the layer repair effect of the dielectric layer is enhanced, and the ESR can be reduced.

The Mw of the glycerin component may be, but is not limited to, 100 or more or 150 or more. When the Mw of the glycerin component is 100 or more (or 150 or more), the effect of suppressing the volatilization of the liquid component when the electrolytic capacitor is exposed to high temperatures is enhanced, and the layer repair performance can be further improved. The Mw of the glycerin component is, for example, 2,000 or less, and may be 1,500 or less. When the Mw is in such a range, the viscosity of the liquid component can be suppressed from increasing, and the dissociation of the acid component and the base component can be further enhanced. These lower and upper limits can be combined in any combination.

The liquid component may contain one kind of glycerin component, or may contain two or more kinds of glycerin components.

Of the sugar alcohol component, as the sugar alcohol, for example, sugar alcohols like those mentioned for the polyalkylene glycol component can be used. The number of the hydroxy groups in the sugar alcohol, for example, may be 10 or less, and may be 8 or less. Examples of the sugar alcohol include tetritol (e.g., erythritol, pentaerythritol, threitol), pentitol (e.g., arabinitol, ribitol, xylitol), hexitol (e.g., mannitol, sorbitol), heptitol, and octitol.

Preferred as the sugar alcohol are tetritol, pentitol, mannitol, sorbitol, heptitol, and octitol, and more preferred are mannitol, sorbitol, erythritol, and pentaerythritol. These sugar alcohols can readily swell the conductive polymer, and can readily facilitate the orientation of the conductive polymer. Therefore, the layer repair effect of the dielectric layer is enhanced, and the ESR can be reduced.

The number of the hydroxy groups in the sugar alcohol derivative is not limited. The derivative may have no hydroxy group, or may have more hydroxy groups than the corresponding sugar alcohol. The number of the hydroxy groups in the derivative may be, for example, 0 (zero) to 10, 0 (zero) to 8, 1 to 8, or 2 to 8. The derivative includes, for example, an ester in which at least part of the hydroxy groups of a sugar alcohol are esterified, and an alkylene oxide adduct of a sugar alcohol. The ester is exemplified, for example, by an organic acid ester (e.g., acetylated sugar alcohol). The alkylene oxide adduct is exemplified, specifically, by an adduct in which, for at least part of the hydroxy groups, one molecule of alkylene oxide is added to one hydroxy group. The alkylene oxide may be, for example, a $C_{2-4}$ alkylene oxide, and is preferably a $C_{2-3}$ alkylene oxide or an ethylene oxide. Specific examples of the alkylene oxide include those mentioned for the polyalkylene glycol component. When the alkylene oxide adduct contains a plurality of alkylene oxide units, at least two of the alkylene oxide units may be of the same kind, or all of the alkylene oxide units may be of different kinds.

The liquid component may contain one kind of sugar alcohol component, or may contain two or more kinds of sugar alcohol components.

In view of facilitating the orientation of the conductive polymer, it is preferable to use a sugar alcohol component having a hydroxy group on each of at least two carbon atoms adjacent to each other.

Preferred among the sugar alcohol components is a sugar alcohol derivative. As the sugar alcohol derivative, an alkylene oxide adduct is preferable. These sugar alcohol components can readily swell the conductive polymer, and can readily facilitate the orientation of the conductive polymer. Therefore, the layer repair effect of the dielectric layer is enhanced, and the ESR can be reduced.

The content of the first solvent in the liquid component is, for example, 5 mass % or more, 10 mass % or more, 25 mass % or more, 30 mass % or more, 50 mass % or more, 75 mass % or more, or 77 mass % or more. In this case, the dissociation of the acid component and the base component can be further improved, and the layer repair performance when the electrolytic capacitor is exposed to high temperatures can be further improved. The content of the first solvent in the liquid component is, for example, 99.9 mass % or less, 99.7 mass % or less, 95 mass % or less, 90 mass % or less, less than 90 mass %, 80 mass % or less, 75 mass % or less, 70 mass % or less, or 50 mass % or less. In this case, since the contents of the acid component and the base component can be increased relatively high, the effect of suppressing the dedoping can be further enhanced. These lower and upper limits can be combined in any combination. The content of the first solvent in the liquid component may be, for example, 50 mass % or more and 99.9 mass % or less, 75 mass % or more and 99.9 mass % or less, or 77 mass % or more and 99.7 mass % or less. Among these ranges, in view of further suppressing the initial ESR and the fluctuations in ESR, the content of the first solvent is preferably 85 mass % or more and 99.9 mass % or less, more preferably 90 mass % or more and 99.7 mass %. In view of further suppressing low the initial leakage current and the fluctuations in leakage current, the content of the first solvent is preferably 75 mass % or more and 95 mass % or less, more preferably 77 mass % or more and 90 mass % or less.

(Non-Aqueous Solvent (Second Solvent))

The liquid component may contain a non-aqueous solvent (hereinafter sometimes referred to as a second solvent) other than the first solvent. Examples of the second solvent include a sulfone compound, a lactone compound, and a carbonate compound. The second solvent may be an aprotic solvent.

Examples of the sulfone compound include sulfolane, dimethyl sulfoxide, and diethyl sulfoxide. Examples of the lactone compound include γ-butyrolactone and γ-valerolactone. Examples of the carbonate compound include dimethyl carbonate, diethyl carbonate, ethyl methyl carbonate, ethylene carbonate, propylene carbonate, and fluoroethylene carbonate.

The liquid component may contain these second solvents singly, or in combination of two or more kinds.

In view of ensuring more excellent layer repair performance of the dielectric layer when the electrolytic capacitor is exposed to high temperatures, the content of the second solvent in the liquid component is preferably 10 mass % or less, more preferably 5 mass % or less or 1 mass % or less.

(Solute)

The liquid component contains an acid component and a base component. The acid component and the base component act as a solute. By containing an acid component in the liquid component, the dedoping phenomenon of the dopant can be suppressed, and the electrical conductivity of the conductive polymer component can be stabilized. Furthermore, even when the dopant is dedoped from the conductive polymer component, the acid component will be re-doped into the site from which the dopant has been dedoped, and the ESR tends to be kept low. As the acid component and the base component, those different from the solvent are used. The dissociation of each of the acid component and the base component in the liquid component is preferably higher than that of the solvent.

In addition, since the liquid component contains a base component, at least part of the acid component is neutralized by the base component. It is therefore possible to suppress the electrode corrosion due to the acid component, while increasing the concentration of the acid component.

The liquid component may contain the acid component and the base component, each in a free state or in the form of a salt.

(Acid Component)

Examples of the acid component include a carboxylic acid, an acid containing a heteroatom other than oxygen atom, a coordination compound with acidity, oxocarbonic acid, Meldrum's acid, and picric acid. The heteroatom may be at least one selected from the group consisting of sulfur atom, boron atom, phosphorus atom, and nitrogen atom. The above heteroatom-containing acid may contain an oxygen atom, in addition to the heteroatom other than oxygen atom. Examples of the above heteroatom-containing acid include a sulfur-containing acid (e.g., sulfuric acid, sulfonic acid, saccharin), a boron-containing acid (e.g., boric acid, halogenated boric acid (e.g., tetrafluoroboric acid), partial esters thereof), a phosphorus-containing acid (e.g., phosphoric acid, halogenated phosphoric acid such as hexafluorophosphoric acid, phosphonic acid, phosphinic acid, partial esters thereof), a nitrogen-containing acid (e.g., nitric acid, nitrous acid). The sulfonic acid includes, for example, an aliphatic sulfonic acid having 1 to 30 carbon atoms, and an aromatic sulfonic acid having 6 to 30 carbon atoms.

The liquid component may contain the acid component singly or in combination of two or more kinds.

Preferred among the acid components are a carboxylic acid, a coordination compound, saccharin, oxocarbonic acid, Meldrum's acid, picric acid, and the like.

The carboxylic acid includes, for example, an aliphatic carboxylic acid, and an aromatic carboxylic acid. In particular, an aromatic carboxylic acid is preferable because of its high stability. Also, a polycarboxylic acid having two or more hydroxy groups is preferable. Specifically, as the aromatic carboxylic acid, phthalic acid, pyromellitic acid, and the like can be used. In particular, phthalic acid is preferable.

Of the acid component, as the coordination compound, for example, a coordination compound including at least one central atom selected from the group consisting of boron, aluminum, and silicon, and an organic molecule having a plurality of ligand atoms bonded to the central atom can be used. The organic molecule, in other words, has a plurality of ligand atoms bonded to the central atom. Here, the plurality of ligand atoms are, for example, at least one selected from the group consisting of an oxygen atom and a nitrogen atom. In the following, an organic molecule having a plurality of ligand atoms bonded to the central atom is sometimes referred to as a "ligand organic molecule".

The ligand atom is at least one selected from the group consisting of an oxygen atom and a nitrogen atom.

When the ligand atom is an oxygen atom, the ligand atom may be bonded to a carbonyl group, or may be bonded to a carbon atom having no oxo group (=O). The coordination compound may contain both a ligand atom bonded to a carbonyl group and a ligand atom bonded to a carbon atom having no oxo group. When the ligand atom is an oxygen atom, the oxygen atom is an oxygen atom that does not form a carboxy group or a carboxy anion.

Specifically, the oxygen atom serving as the ligand atom can be an alcoholic or phenolic hydroxy group or an alkoxy oxygen, an oxy group, or an oxy group of a carboxy group. In particular, it is preferable that at least one of an alcoholic or phenolic alkoxy oxygen and an oxy group of a carboxy group is bonded to the central atom, because the bond with the central atom is stable.

On the other hand, when the ligand atom is a nitrogen atom, the nitrogen atom is a nitrogen atom that forms an amino group, an amide group, an imide group, an imide anion, and the like.

The ligand organic molecule may form, without particular limitation, a complex anion together with the central atom. At this time, the ligand organic molecule may form, for example, an organic group from which the protons bonded to the ligand atoms have been deprotonated.

The ligand organic molecule preferably has an electron-withdrawing substituent. Since such a substituent tends to stabilize the electrons of the ligand atoms of the organic molecule, a product during hydrolysis is less likely to corrode the electrodes of the capacitor. Examples of the electron-withdrawing substituent include a nitro group, a carboxy group, an ester group, a halogen atom (e.g., fluorine atom, chlorine atom), an acyl group, a tosyl group, a keto group, a cyano group, and a methyl sulfonyl group.

On the other hand, the organic molecule may have an electron-donating substituent. Such a substituent contributes to the stability of the liquid component, especially when adding water or in a high humidity environment, because electrons flow into the empty orbital on the central atom to facilitate the stabilization. Examples of the electron-donating substituent include an amino group, an alkyl group, an aryl group (e.g., phenyl group), and an alkoxy group.

The ligand organic molecule includes, for example, a hydroxy acid and a polycarboxylic acid (e.g., dicarboxylic acid). Examples of the hydroxy acid include an aliphatic hydroxy acid (e.g., glycolic acid, lactic acid, tartronic acid, α-, β- or γ-hydroxybutyric acid, malic acid, citric acid) and an aromatic hydroxy acid (e.g., salicylic acid, hydroxybenzoic acid, mandelic acid, benzylic acid, gallic acid). Examples of the polycarboxylic acid include an aliphatic polycarboxylic acid (e.g., oxalic acid, malonic acid, succinic acid, adipic acid, maleic acid) and an aromatic polycarboxylic acid (e.g., phthalic acid).

The ligand organic molecule may be, for example, a polyol having an aromatic ring, at least a first hydroxy group, and a group including a second hydroxy group. The first hydroxy group may be bonded to the aromatic ring. The group including a second hydroxy group may be bonded at the ortho position with respect to the first hydroxy group on the aromatic ring. The group including a second hydroxy group may be a second hydroxy group, or an alkyl group having a second hydroxy group. The alkyl group having a second hydroxy group may be, for example, an alkyl group with 1 to 4 carbon atoms having a secondary hydroxy group. Examples of the alkyl group having a second hydroxy group include a methylol group, an ethylol group, a propylol group, or a butylol group. Preferred is a methylol group, in view of the stability of the complex anion.

More preferred are a ligand organic molecule represented by the following general formulas (1), (2), (3), (4), (5) or (6), and the like.

[Chem. 1]

(1)

(2)

-continued (3)

(4)

[Chem. 2]

(5)

(6)

[$R^1$, $R^2$, $R^3$, $R^4$, $R^5$ and $R^6$ are each independently a hydrogen atom, a halogen atom, a hydroxy group, an alkoxy group having 1 to 10 carbon atoms, a carboxy group, a group with 2 to 10 carbon atoms having an ester bond, a saturated aliphatic hydrocarbon group with 1 to 24 carbon atom which may have a substituent, an unsaturated aliphatic hydrocarbon group with 2 to 24 carbon atoms which may have a substituent, or an aromatic hydrocarbon group with 6 to 14 carbon atoms which may have a substituent.]

Examples of the halogen atom include a fluorine atom, a chlorine atom, and a bromine atom.

Examples of the alkoxy group with 1 to 10 carbon atoms include a methoxy group, an ethoxy group, an n- or iso-propoxy group, an n-, sec-, iso- or tert-butoxy group, an n-pentoxy group, an n-hexoxy group, an octoxy group, a decoxy group, and a phenoxy group.

Examples of the group with 2 to 10 carbon atoms having an ester bond include an alkoxycarbonyl group with 2 to 10 carbon atoms. The alkoxycarbonyl group includes, for example, a group in which the hydrogen atom of the carboxy group is substituted by a methyl group, an ethyl group, a propyl group, a butyl group, a pentyl group, a hexyl group, a pentyl group, an octyl group, or a nonyl group.

The saturated aliphatic hydrocarbon group with 1 to 24 carbon atoms which may have a substituent includes, for example, an alkyl group with 1 to 24 carbon atoms, and a cycloalkyl group with 3 to 24 carbon atoms. Examples of the alkyl group include a methyl group, an ethyl group, an n-propyl group, an iso-propyl group, an n-butyl group, an iso-butyl group, a sec-butyl group, a tert-butyl group, an n-pentyl group, a 2-methylbutyl group, a 3-methylbutyl group, a 2-ethylpropyl group, an n-hexyl group, a 1-methylpentyl group, a 2-methylpentyl group, a 3-methylpentyl group, a 4-methylpentyl group, a 1-ethylbutyl group, a 2-ethylbutyl group, a 1-propylpropyl group, a 2-propylpropyl group, a 1-iso-propylpropyl group, a 2-iso-propylpropyl group, an n-heptyl group, a 1-methylhexyl group, a 2-methylhexyl group, a 3-methylhexyl group, a 4-methylhexyl group, a 5-methylhexyl group, a 1-ethylpentyl group, a 2-ethylpentyl group, a 3-ethylpentyl group, a 2,2-dimethylpropyl group, a 1-propylbutyl group, a 2-propylbutyl group, a 1-iso-propylbutyl group, a 2-iso-propylbutyl group, an n-octyl group, a 1-methylheptyl group, a 2-methylheptyl group, a 3-methylheptyl group, a 4-methylheptyl group, a 5-methylheptyl group, a 6-methylheptyl group, a 1-ethylhexyl group, a 2-ethylhexy group, a 3-ethylhexyl group, a 4-ethylhexyl group, a 1-propylpentyl group, a 2-propylpentyl group, a 1-iso-propylpentyl group, a 2-iso-propylpentyl group, a 3-propylpentyl group, a 3-iso-propylpentyl group, a 1-butylbutyl group, a 2-butylbutyl group, a 1-iso-butylbutyl group, a 2-iso-butylbutyl group, a 1-tert-butylbutyl group, a 2-tert-butylbutyl group, a 1,1,3,3-tetramethylbutyl group, a nonyl group, and a decyl group. The alkyl group may have 1 to 20 carbon atoms, 1 to 16 carbon atoms, or 1 to 12 carbon atoms. Examples of the cycloalkyl group include a cyclopentyl group, a cyclohexyl group, a cyclopentyl group, and a cyclooctyl group. The cycloalkyl group may have 5 to 10 carbon atoms, or 5 to 8 carbon atoms.

The unsaturated aliphatic hydrocarbon group with 2 to 24 carbon atoms which may have a substituent includes, for example, an alkenyl group. Examples of the alkenyl group include a vinyl group, a propenyl group, a butenyl group, a pentenyl group, a hexenyl group, an octenyl group, a decenyl group, and an isopropenyl group. The unsaturated aliphatic hydrocarbon group may have 2 to 18 carbon atoms.

Examples of the substituent which may be included in the saturated aliphatic hydrocarbon group with 1 to 24 carbon atoms or the unsaturated aliphatic hydrocarbon group with 2 to 24 carbon atoms include a hydroxy group, an alkoxy group (e.g., alkoxy group with 1 to 4 carbon atoms), a carboxy group, a nitro group, a halogen atom, a cyano group, and an amino group.

The aromatic hydrocarbon group with 6 to 14 carbon atoms which may have a substituent includes, for example, an aryl group, an arylalkyl group (or an aralkyl group). Examples of the aryl group include a phenyl group, a tolyl group, a xylyl group, and a naphthyl group. The aryl group may have an aromatic hydrocarbon ring having 6 to 10 carbon atoms. The arylalkyl group includes, for example, an alkyl group with 1 to 4 carbon atoms having an aryl group with 6 to 10 carbon atoms. Examples of the arylalkyl group include a benzyl group and a phenethyl group. Examples of the substituent include an alkyl group (e.g., alkyl group with 1 to 6 carbon atoms), a hydroxy group, an alkoxy group (e.g., alkoxy group with 1 to 4 carbon atoms), a carboxy group, a nitro group, a halogen atom, a cyano group, and an amino group.

More specifically, a polyol having a second hydroxy group bonded to an aromatic ring is exemplified by catechol, pyrogallol, gallic acid, a gallic acid ester (e.g., gallic acid alkyl, such as an ester with an alkyl having 1 to 4 carbon atoms), hexahydroxybenzene, 1,2-dihydroxynaphthalene, 2,3-dihydroxynaphthalene, 4,4'-(2,3-dimethyltetramethylene) dipyrocatechol, 2,3,4,4'-tetrahydroxydiphenylmethane, and the like. To the aromatic ring of these polyols, a substituent may be bonded.

A polyol having a first hydroxy group and an alkyl group having a second hydroxy group (e.g., methylol group) is typically exemplified by salicyl alcohol, 2,5-dihydroxybenzyl alcohol, 2,6-bis(hydroxymethyl)-p-cresol, and the like. To the aromatic ring of these polyols, a substituent may be bonded.

Examples of the substituent which may be on the aromatic ring of the polyol include the groups or atoms as mentioned above for $R^1$ to $R^6$ (excluding hydrogen atom).

The central atom is coordinated with, for example, at least one ligand organic molecule selected from the group consisting of a hydroxy acid, a polycarboxylic acid, and a polyol. The number of the ligand organic molecules coordinated per one central atom may be one, or two or more. In view of the stability of the complex anion, the ligand organic molecule that may be selected is such that two or more molecules (e.g., two molecules or three molecules) of the ligand organic molecule are to be coordinated per two central atoms.

When the central atom is boron or aluminum, for example, a tetra-coordinated complex anion can be formed. A typical example thereof is a complex anion in which two molecules of a ligand organic molecule (e.g., hydroxy acid, dicarboxylic acid, diol) are coordinated as the ligand organic molecules to a boron atom or an aluminum atom. Such a complex anion includes, for example, borodisalicylic acid, borodioxalic acid, borodiglycolic acid, borodicatechol, borodipyrogallol, borodigallic acid, and borodigallic acid alkyl ester, but are not limited thereto. The alkyl of the borodigallic acid alkyl ester includes, for example, a $C_{1-6}$ alkyl (e.g., methyl, ethyl, n-propyl, isobutyl, n-butyl), and is preferably a $C_{1-4}$ alkyl. Also, when the central atom is silicon, for example, a penta-coordinated or hexa-coordinated complex anion can be formed. A typical example thereof is a complex anion in which three molecules of diol are coordinated as the ligand organic molecules to a silicon atom.

The central atom and the ligand organic molecule (or complex anion) bonded thereto exhibit acidity, and therefore, can contribute to control the pH of the liquid component within the range mentioned below.

The concentration of the complex anion in the liquid component may exceed, for example, 0.1 mass %, and may be 1.0 mass % or more. By containing the complex anion in this way, the stability of the liquid component at high temperatures is significantly enhanced, and the heat resistance of the electrolytic capacitor is remarkably improved. However, in view of suitably maintaining the viscosity of the liquid component, the content of the complex anion in the liquid component may be, for example, 30 mass % or less, and may be 20 mass % or less.

The concentration of the complex anion is defined as the maximum amount of a complex anion that the central atom and the organic molecule(s) with the aforementioned structure having a plurality of ligand atoms can form, contained in the liquid component. Here, the maximum amount is calculated assuming that the central atom and the organic molecule(s) all form a complex ion, regardless of whether or not they actually form a complex anion. When the equivalent weight of the central atom and the equivalent weight of the organic molecule(s) are different, the above maximum amount is calculated, naturally, based on the smaller one of the two.

The complex anion can be quantitatively and qualitatively analyzed, for example, as follow.

<Qualitative Analysis>

First, 30 mL of the liquid component is weighed into a glass container having a sealing lid, and the infrared absorption spectrum (IR) of the liquid component in the container is measured using a predetermined measuring instrument (IRSprit, available from Shimadzu Corporation). Next, the container storing the liquid component is sealed and allowed to stand for a certain period of time in a high temperature environment. Thereafter, the liquid component in the container is left to cool, and then, the IR thereof is measured again. The stability of the complex anion can be evaluated from the change in the stretching vibration spectrum of the bond between the central atom and the ligand atoms. It can be said that the smaller the change in the spectrum is, the higher the stability of the complex anion is.

<Quantitative Analysis>

First, 30 mL of the liquid component is weighed into a glass container having a sealing lid, and the nuclear magnetic resonance spectrum (NMR) of the liquid component in the container is measured using a predetermined measuring instrument (AVANCE III HD, available from BRUKER), to determine an initial production ratio ($G0$) of the complex anion, from the peak intensity. Next, the container storing the liquid component is sealed and allowed to stand for a certain period of time in a high temperature environment. Thereafter, the liquid component in the container is left to cool, and then the NMR thereof is measured again, to determine a production ratio ($G1$) of the produced complex anion and unreacted organic molecule. The decomposition percentage of the complex anion is determined using the formula below, from which the stability of the complex anion can be evaluated. It can be said that the smaller the decomposition percentage is, the higher the stability of the complex anion is.

Production ratio $G1$ of complex anion (%)=(Peak intensity of complex anion)/(Peak intensity of complex anion+Peak intensity of unreacted organic molecule)×100

Decomposition percentage of complex anion (%)=Initial production ratio $G0$ of complex anion (%)−Production ratio $G1$ of complex anion (%)

Among the acid components, the above coordination compound, saccharin, oxocarbonic acid, Meldrum's acid, picric acid, and the like, are, unlike carboxylic acids, hardly cause a dehydration condensation reaction with the hydroxy group included in the first solvent. Therefore, the effect of suppressing the volatilization of the liquid component is further enhanced, and a more excellent effect of suppressing the dedoping can be obtained. Furthermore, the above coordination compound has a relatively low pKa, and therefore, even when combined with a base component the pKa of the conjugate acid of which is relatively low, high dissociation of the acid component and the base component can be ensured. Accordingly, in view of ensuring more excellent layer repair performance and electrical conductivity, it is advantageous to use the above coordination compound.

Also preferred is to use at least one selected from the group consisting of saccharin, oxocarbonic acid, Meldrum's acid, and picric acid. Examples of the oxocarboxylic acid include delta acid, squaric acid, croconic acid, rhodizonic acid, and heptagonic acid. These acid components, unlike carboxylic acids, do not release carbon dioxide even when the electrolytic capacitor is exposed to high temperatures. The electrolytic capacitor is soldered to a substrate, usually through a reflow process in which the electrolytic capacitor is exposed to high temperatures. If a large amount of gas is generated in the reflow process, the airtightness of the electrolytic capacitor is reduced, and the reliability is reduced. Therefore, by using the acid component as described above, the reduction in airtightness and reliability during the reflow process can be suppressed.

In view of ensuring higher dissociation of the acid component, the pKa of the acid component is preferably 7 or less, more preferably 6 or less or 5 or less. In view of reducing the electrode corrosion, the pKa of the acid component is preferably 1 or more, more preferably 2 or more. These upper and lower limits can be combined in any combination.

The acid component may include an acid with a pKa of 1 or more and 6 or less (e.g., 1 or more and 5 or less, 2 or more and 6 or less, or 2 or more and 5 or less). When using such an acid component, even though used in combination with a base component whose dissociation is relatively low, more excellent layer repair performance is likely to be ensured, (Base Component)
(First Base)

The base component contains a first base a conjugate acid of which has a pKa of 5 or more and 10 or less and which has no boiling point or a boiling point of 100° C. or higher. By containing the first base in the liquid component, the volatilization of the liquid component can be suppressed even when the electrolytic capacitor is exposed to high temperatures, and an excellent dedoping suppressing effect produced by the acid component and an excellent layer repair performance can be both achieved.

The pKa of the conjugate acid of the first base is 5 or more and 10 or less, may be 5 or more and 8 or less, may be 6 or more and 8 or less, may be 6 or more and 10 or less, may be 7 or more and 10 or less, or may be above 8 and 10 or less. When the pKa of the conjugate acid exceeds 10, the dedoping suppressing effect produced by the acid component is reduced. Moreover, the electrode corrosion tends to occur. When the pKa of the conjugate acid is less than 5, the dissociation of the acid component and the base component is greatly reduced, and the volatilization of the liquid component becomes significant. As a result, the layer repair performance is reduced, and the electrical conductivity is reduced. The base component may include, as the first base, one whose conjugate acid has a pKa of 5 or more and 8 or less (e.g., 6 or more and 8 or less), or one whose conjugate acid has a pKa of 6 or more and 10 or less (e.g., 7 or more and 10 or less, or above 8 and 10 or less).

When using a first base whose conjugate acid has a pKa of 5 or more and 8 or less, it is preferable to use at least a coordination compound, as the acid component. When using a first base whose conjugate acid has a pKa of 5 or more and 8 or less, it is also preferable to use at least an acid having a pKa of 2 or more and 5 or less, as the acid component. When a carboxylic acid (e.g., aromatic carboxylic acid) is used as the acid component, it is preferable to use at least a first base whose conjugate acid has a pKa of greater than 8 and 10 or less. By combining as above, more excellent dedoping suppressing effect can be ensured. Also, the dissociation of the acid component and the base component is enhanced, and more excellent layer repair performance is likely to be ensured.

The boiling point of the first base is 100° C. or higher. In view of suppressing the volatilization of the liquid component and achieving more excellent layer repair performance, the boiling point of the first base is preferably 130° C. or higher, more preferably 150° C. or higher. The first base may have no boiling point. The first base having no boiling point may have a thermal decomposition temperature which is within the temperature range mentioned above as the boiling point.

In view of suppressing the precipitation of the first base in the liquid component and keeping the viscosity of the liquid component low, the first base is preferably liquid at room temperature (i.e., temperature of 20° C. or higher and 35° C. or lower), and more preferably, the melting point of the first base is 30° C. or lower.

Examples of the first base include an amine compound and an ammonium compound. The amine compound may be any one of a primary amine, a secondary amine, and a tertiary amine. It is advantageous to use at least one of a secondary amine and a tertiary amine. In this case, while ensuring high dissociation of the acid component and excellent dedoping suppressing effect produced by the acid component, the electrode corrosion can be suppressed. The ammonium compound may be, for example, a quaternary ammonium compound corresponding to a tertiary amine Such a quaternary ammonium compound further has one organic group (e.g., alkyl group, aryl group) on the nitrogen atom of the tertiary amine. The base component may contain the first base singly or in combination of two or mor kinds.

The amine compound may be any one selected from an aliphatic amine, an alicyclic amine (e.g., cycloalkyl amine such as cyclohexyl amine, amantadine), an aromatic amine, and a heterocyclic amine. These amines are sometimes referred to as a first amine compound. The first amine compound has no polyalkylene oxide chain (or polyoxyalkylene chain) Among these, an aliphatic amine and a heterocyclic amine are preferable, in view of controlling the boiling point and the pKa of the conjugate acid within the above ranges. The amine compound also encompasses a second amine compound having a polyalkylene oxide chain. Examples of such a second amine compound include a polyalkylene oxide adduct in which a polyalkylene oxide is added to a first amine compound or ammonia. The pKa of the conjugate acid and the boiling point of the base component can be adjusted by selecting, in the amine compound, at least one of the following: the number of carbon atoms of the organic group bonded to the nitrogen atom of the amine, the structure of the organic group, the functional group included in the organic group, the number of repeating alkylene oxides in the polyalkylene oxide chain, the number of groups having a polyalkylene oxide chain, and the like.

The aliphatic amine includes, for example, a trialkyl amine having at least one $C_{4-20}$ alkyl group, a tertiary alkanolamine, and a polyalkylene polyamine.

The above trialkyl amine may have, in addition to a $C_{4-20}$ alkyl group (preferably, a $C_{4-10}$ alkyl group), a $C_{1-4}$ alkyl group. The number n1 of the $C_{4-20}$ alkyl groups in the trialkyl amine is 1 to 3, the number n2 of the $C_{1-4}$ alkyl groups is 0 to 2, and n1+n2=3. Of the three alkyl groups in the trialkyl amine, at least two may be the same, or all may be different. Specific examples of such a trialkyl amine include tributylamine, triisobutylamine, dimethyl hexyl amine, and diethyl hexyl amine.

The tertiary alkanol amine has at least one hydroxyalkyl group, and may have, in addition to the hydroxyalkyl group, a hydrocarbon group. The number n3 of the hydroxyalkyl groups in the alkanol amine is 1 to 3, the number n4 of the hydrocarbon groups is 0 to 2, and n3+n4=3. The hydroxyalkyl group is preferably a hydroxy $C_{1-10}$ alkyl group, and may be a hydroxy $C_{1-6}$ alkyl group or a hydroxy $C_{1-4}$ alkyl group. The hydrocarbon group may be an alicyclic or aromatic hydrocarbon group, and is preferably an aliphatic hydrocarbon group, more preferably an alkyl group. The alkyl group includes, for example, a $C_{1-22}$ alkyl group, and may be a $C_{1-20}$ alkyl group, may be a $C_{1-10}$ alkyl group, and may be a $C_{1-6}$ alkyl group or a $C_{1-4}$ alkyl group. The alkyl group may be a $C_{8-22}$ alkyl group, a $C_{10-22}$ alkyl group, or a $C_{14-22}$ alkyl group. Specific examples of the tertiary alkanol amine include dimethylethanolamine, diethylethanolamine, triethanolamine, stearyldiethanolamine, octadecyldiethanolamine, and behenyldiethanolamine.

The polyalkylene polyamine includes, for example, a poly($C_{2-4}$ alkylene) polyamine. The number of the alkylene units in the polyalkylene polyamine is, for example, 2 or more and 10 or less, or may be 2 or more and 6 or less. Specific examples of the polyalkylene polyamine include ethylenediamine, diethylenetriamine, triethylenetetramine, tetraethylenepentamine, pentaethylenehexamine, spermidine, and spermine. The polyalkylene polyamine also encompasses those having a substituent, such as an alkyl group or a hydroxyalkyl group, on the nitrogen atom. The alkyl moiety of the alkyl group or the hydroxyalkyl group includes, for example, a $C_{1-20}$ alkyl, and may be a $C_{1-10}$ alkyl, and may be a $C_{1-6}$ alkyl or a $C_{1-4}$ alkyl.

In view of further enhancing the effect of reducing the changes in ESR and the leakage current, it is also preferable when the first base includes at least a heterocyclic amine. The heterocyclic amine includes, for example, a 4- to 20-membered or a 4- to 10-membered heterocyclic amine. The heterocycle may be a bridged heterocycle. The heterocyclic amine may have one nitrogen atom that constitutes a heterocyclic ring, and may have two or more nitrogen atoms that constitute a heterocyclic ring. The heterocyclic ring may have, as a ring-constituting atom, one or two or more heteroatoms (e.g., oxygen atom, sulfur atom) other than nitrogen atom. The heterocycle may be saturated or unsaturated. The heterocyclic amine may be of a secondary amine or a tertiary amine Especially, it is preferable to use at least a heterocyclic amine which is a tertiary amine. The heterocyclic amine also encompasses those having one or more substituents (e.g., hydroxy group, amino group or substituted amino group, alkyl group, alkoxy group, hydroxyalkyl group) on the heterocyclic ring. Specific examples of the heterocyclic amine include pyrrolidine, piperidine, piperazine, morpholine, N-alkylmorpholine (e.g., N-methylmorpholine, N-butylmorpholine), N-hydroxyalkylmorpholine, pyridine, hydroxyalkylpyridine (e.g., hydroxy ethylpyridine), pyridazine, pyrimidine, pyrazine, and 4-dimethylaminopyridine. In view of adjusting the boiling point and the pKa of the conjugate acid within suitable ranges, the heterocyclic amine is preferably a tertiary amine, more preferably an unsaturated tertiary amine. Furthermore, in view of maintaining an excellent dedoping suppressing effect produced by the acid component, thereby to suppress the electrode corrosion, the heterocyclic amine preferably does not have a free amino group. More preferred as the heterocyclic amine are pyridine, N-alkylmorpholine, N-hydroxyalkylmorpholine, and the like. The alkyl group on the nitrogen atom of the morpholine or the alkyl moiety of the hydroxyalkyl group may have 1 to 20 carbon atoms, and may have 1 to 10 carbon atoms. The alkyl moiety may be a methyl or an ethyl, but in view of adjusting the boiling point and pKa of the conjugate acid within suitable ranges, the alkyl moiety is preferably a $C_{3-20}$ alkyl, and may be a $C_{4-20}$ alkyl or a $C_{4-10}$ alkyl (e.g., butyl). In view of adjusting the degree of dissociation of the first amine compound within an appropriate range, the alkyl moiety of the alkyl group or the hydroxyalkyl group on the nitrogen atom of the morpholine preferably has 1 to 4 carbon atoms. Especially, in N-alkylmorpholine, it is preferably when such an alkyl group has the number of carbon atoms within the range as above.

The polyalkylene oxide chain in the second amine compound includes, for example, a poly $C_{2-4}$ alkylene oxide chain, and may be a poly $C_{2-3}$ alkylene oxide chain (esp., a polyethylene oxide chain) In one polyalkylene oxide chain, the number of repeating alkylene oxides may be, for example, 2 or more or 4 or more. In one organic group, the number of repeating alkylene oxides may be 100 or less, and may be 50 or less, or 30 or less. These lower and upper limits may be combined in any combination. The alkylene oxide units included in the second amine compound may be of the same kind, or of two or more different kinds.

Preferred as the second amine compound is an alkylene oxide adduct of alkanolamine. The alkanolamine moiety is a primary, secondary or tertiary alkanolamine having 1 to 3 hydroxyalkyl groups. Examples of the tertiary alkanolamine include those as mentioned above. The primary or secondary alkanolamine includes, for example, a mono- or di-$C_{1-10}$ alkanolamine, and may be a mono- or di-$C_{1-6}$ alkanolamine, and may be a mono- or di-$C_{1-4}$ alkanolamine Specific examples of the primary or secondary alkanolamine include ethanolamine, diethanolamine, propanolamine, and dipropanolamine.

In the second amine compound, the alkylene oxide unit may be added to the nitrogen atom of the first amine compound or ammonia, and when the first amine compound is an alkanolamine, the alkylene oxide unit may be added to the hydroxy moiety of the hydroxyalkyl group. When the alkylene oxide unit is added to the hydroxy moiety of the hydroxyalkyl group, for the sake of convenience, the number of repeating alkylene oxides is counted including the moiety of the oxyalkylene group corresponding to the hydroxyalkyl group (i.e., counted for the whole of a polyalkylene oxide chain bonded to the nitrogen atom).

The base component contains at least a first base, and may contain a second base other than the first base. The proportion of the first base in the base component is preferably high, so that the effect produced by the first base can be fully exerted. The proportion of the first base in the base component is, for example, 90 mass % or more, may be 95 mass % or more, and may be 99 mass % or more. The proportion of the first base in the base component is 100 mass % or less. The base component may be constituted only of the first base.

(Second Base)

The second base includes, for example, a base satisfying (a) the pKa of the conjugate acid thereof is above 10 and below 5, or (b) the boiling point thereof is lower than 100° C., or satisfying both (a) and (b).

Examples of the second base include ammonia, an amine (specifically, primary amine, secondary amine, tertiary amine), a quaternary ammonium compound, and an amidinium compound. The liquid component may contain the second base singly, or in combination of two or more.

The amine may be aliphatic, alicyclic, aromatic, or heterocyclic. Examples of the amine include a mono-, di- or tri-$C_{1-4}$ alkylamine (e.g., methylamine, dimethylamine, trimethylamine, ethylamine, diethylamine, triethylamine, N,N-diisopropylethylamine), aniline, phenethylamine, and toluidine. Examples of the quaternary ammonium compound include an amidine compound (including an imidazole compound). The imidazole compound is exemplified by imidazole, 1,2,3,4-tetramethylimidazole, 1,3-dimethyl-2-ethylimidazole, and the like.

(Others)

The molar ratio of the acid component to the base component (=acid component/base component) is, for example, 0.1 or more, may be 0.2 or more, may be 0.5 or more or 0.8 or more, may be 1 or more or 1.01 or more, may be 1.02 or more or 1.05 or more, and may be 1.1 or more. When a carboxylic acid is used as the acid component, it is preferable to use the acid component in excess of the base component, in view of ensuring more excellent dedoping suppressing effect. In this case, the above molar ratio is preferably 1.01 or more or 1.02 or more, and may be 1.05 or more or 1.1 or more. The molar ratio of the acid component to the base component is, for example, 50 or less, may be 30 or less, and may be 10 or less. These lower and upper limits can be combined in any combination.

The total concentration of the acid component and the base component in the liquid component is, for example, 0.1 mass % or more, and may be 0.3 mass % or more, 0.5 mass % or more, 5 mass % or more, or 10 mass % or more. When the concentration of the solute is within such a range, by combining with the first solvent, the acid component and the base component can be dissociated with high dissociation in the liquid component, and more excellent layer repair performance of the dielectric layer can be ensured. The total concentration of the acid component and the base component may be 25 mass % or less, 23 mass % or less, 15 mass % or less, 12 mass % or less, or 10 mass % or less. When the concentration of the solute is within such a range, the effect of suppressing the dedoping of the dopant can be further enhanced. These lower and upper limits can be combined in any combination. The total concentration of the acid component and the base component in the liquid component may be, for example, 0.1 mass % or more and 25 mass % or less, or 0.3 mass % or more and 23 mass % or less. Among these ranges, in view of further suppressing low the initial ESR and the fluctuations in ESR, the total concentration of the acid component and the base component is preferably 0.1 mass % or more and 12 mass % or less, more preferably 0.3 mass % or more and 10 mass % or less. Moreover, in view of further suppressing low the initial leakage current and the fluctuations in leakage current, the total concentration of the acid component and the base component is preferably 5 mass % or more and 25 mass % or less, more preferably 10 mass % or more and 23 mass % or less.

The pH of the liquid component is preferably 6 or less, more preferably 4 or less, and may be 3.8 or less, or 3.6 or less. By setting the pH of the liquid electrolyte within such a range, the deterioration of the conductive polymer component is likely to be suppressed. The pH is preferably 1.0 or higher.

(Capacitor Element)

The capacitor element includes, at least, an anode body having a dielectric layer at a surface of the anode body, and a conductive polymer component covering part of the dielectric layer.

(Anode Body)

The anode body can include a valve metal, an alloy containing a valve metal, a compound containing a valve metal, and the like. These materials can be used singly or in combination of two or more kinds. As the valve metal, for example, aluminum, tantalum, niobium, and titanium are preferably used. An anode body having a porous surface can be obtained by, for example, roughening a surface of a base material (e.g., a foil- or plate-like base material) containing a valve metal by etching or other methods. The anode body may be a molded body of valve metal-containing particles or a sintered body thereof. The sintered body has a porous structure.

(Dielectric Layer)

The dielectric layer is formed by anodizing the valve metal at the surface of the anode body by chemical conversion treatment or the like. It suffices as long as the dielectric layer is formed so as to cover at least part of the anode body. The dielectric layer is usually formed at the surface of the anode body. Since being formed at the surface of the porous anode body, the dielectric layer is formed along the inner walls of the pores or the recesses (pits) at the surface of the anode body.

The dielectric layer contains an oxide of the valve metal. For example, when tantalum is used as the valve metal, the dielectric layer contains $Ta_2O_5$, and when aluminum is used as the valve metal, the dielectric layer contains $Al_2O_3$. The dielectric layer is not limited thereto, and may be any one that functions as a dielectric. When the surface of the anode body is porous, the dielectric layer is formed along the surface of the anode body (including the inner walls of the pores).

(Conductive Polymer Component)

The conductive polymer component contains, for example, a conductive polymer and a dopant. The conductive polymer component is attached so as to cover part of the dielectric layer. The conductive polymer component attached to the surface of the dielectric layer may constitute a conductive polymer layer. The conductive polymer layer is sometimes called a solid electrolyte layer. The conductive polymer component constitutes at least part of a cathode body in the electrolytic capacitor. The conductive polymer component may further contain an additive, as needed.

The conductive polymer includes, for example, π-conjugated polymer. Examples of the conductive polymer include polypyrrole, polythiophene, polyfuran, polyaniline, polyacetylene, polyphenylene, polyphenylene vinylene, polyacene, and polythiophene vinylene. These may be used singly or in combination of two or more kinds, and may be a copolymer of two or more kinds of monomers.

In the present specification, polypyrrole, polythiophene, polyfuran, polyaniline, and the like mean polymers including polypyrrole, polythiophene, polyfuran, polyaniline, and the like, respectively, as a backbone thereof. Accordingly, polypyrrole, polythiophene, polyfuran, polyaniline and the like can include derivatives of each of them. For example, polythiophene includes poly(3,4-ethylenedioxythiophene).

The dopant may be a polyanion. Specific examples of the polyanion include polyvinyl sulfonic acid, polystyrene sulfonic acid, polyallyl sulfonic acid, polyacryl sulfonic acid, polymethacryl sulfonic acid, poly(2-acrylamido-2-methylpropanesulfonate), polyisoprene sulfonic acid, and polyacrylic acid. These may be used singly or in combination of two or more kinds. Moreover, these may be a homopolymer, and may be a copolymer of two or more kinds of monomers. In particular, a polyanion derived from polystyrene sulfonic acid is preferable.

The conductive polymer layer can be formed by, for example, chemically and/or electrolytically polymerizing a raw material monomer on the dielectric layer. Alternatively, it can be formed by bringing a solution in which the conductive polymer is dissolved, or, a dispersion liquid in which the conductive polymer is dispersed, into contact with the dielectric layer. It suffices as long as the conductive polymer layer is formed so as to cover at least part of the dielectric layer.

For the cathode body, likewise for the anode body, a metal foil may be used. The metal may be of any kind, but is preferably a valve metal, such as aluminum, tantalum, and niobium, or an alloy containing a valve metal. A surface of the metal foil may be roughened, as needed. The metal foil may be provided at its surface with a chemical conversion film, or with a surface film of a metal different from the metal constituting the metal foil (i.e., a dissimilar metal) or of a non-metal. Examples of the dissimilar metal and the non-metal include a metal, such as titanium, and a non-metal, such as carbon.

(Separator)

When a metal foil is used for the cathode body, a separator may be disposed between the metal foil and the anode body. As the separator, without particular limitation, for example, a nonwoven fabric containing fibers of cellulose, polyethylene terephthalate, vinylon, or polyamide (e.g., aliphatic polyamide, aromatic polyamide such as aramid) may be used.

(Others)

The electrolytic capacitor may be of a wound type, and may be a chip type or a laminated type. The configuration of the capacitor element may be selected according to the type of the electrolytic capacitor.

The electrolytic capacitor has at least one capacitor element, and may have a plurality of capacitor elements. The number of capacitor elements included in the electrolytic capacitor may be determined according to the use.

In the following, the electrolytic capacitor according to the present disclosure will be more specifically described by way of an embodiment. The electrolytic capacitor according to the present disclosure is not limited to the following embodiment.

Figure 1:
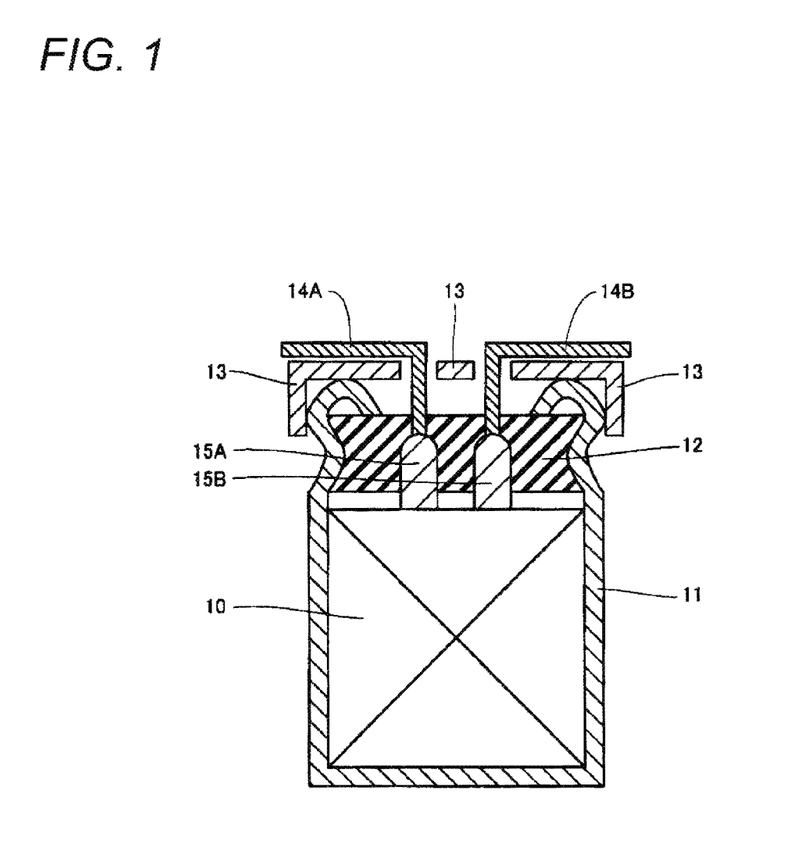
FIG. 1 A schematic cross-sectional view of an electrolytic capacitor according to one embodiment of the present disclosure.
Figure 2:
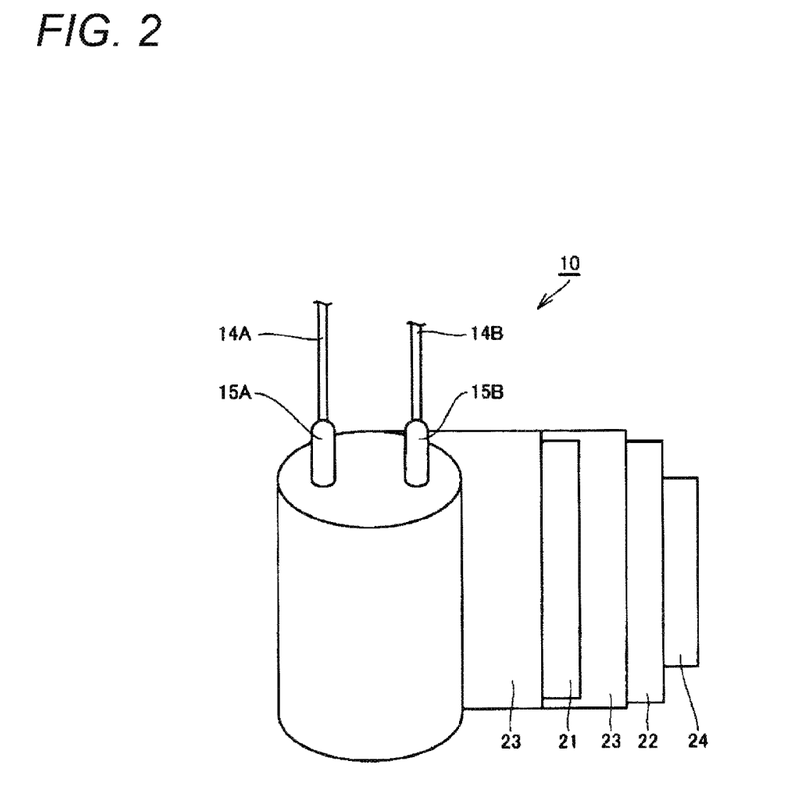
FIG. 2 A schematic illustration for explaining a configuration of the capacitor element of FIG. 1.

Here, FIG. 1 is a schematic cross-sectional view of an example of the electrolytic capacitor according to the present embodiment. FIG. 2 is a partially-exploded schematic view of a capacitor element according to the above electrolytic capacitor.

The electrolytic capacitor illustrated in FIG. 1 includes a capacitor element 10, a bottomed case 11 housing the capacitor element 10, a sealing member 12 closing an opening of the bottomed case 11, a seat plate 13 covering the sealing member 12, lead wires 14A and 14B each extended from the sealing member 12 and passing through the seat plate 13, lead tabs 15A and 15B each connecting the lead wire with an electrode of the capacitor element 10, and a liquid component (not shown). The open end of the bottomed case 11 is curled so as to be crimped onto the sealing member 12.

The capacitor element 10 is produced from a wound body as illustrated in FIG. 2. The wound body is a semi-finished product of the capacitor element 10, in which a conductive polymer compound is not yet disposed between an anode body 21 having a dielectric layer at its surface and a cathode body 22. The wound body is formed by winding the anode body 21 connected to the lead tab 15A and the cathode body 22 connected to the lead tab 15B, with a separator 23 interposed therebetween. The outermost layer of the wound body is secured with a winding stop tape 24. FIG. 2 shows a partially exploded state before the outermost layer of the wound body is secured.

The anode body 21 has a metal foil with a roughened surface, and a dielectric layer is formed at the roughened surface. The capacitor element 10 is completed by attaching a conductive polymer compound on at least part of the surface of the dielectric layer. The capacitor element 10 is housed, together with the liquid component (not shown), in the outer case.

An exemplary method of manufacturing an electrolytic capacitor will be described below.

(i) Step of Preparing Anode Body 21 Having Dielectric Layer and Cathode Body 22

For raw materials of the anode body 21 and the cathode body 22, a metal foil containing a valve metal is used. In the case of the anode body 21, by etching treatment or the like, a surface of the metal foil is roughened and a plurality of irregularities are formed at the surface of the metal foil. This is followed by forming a dielectric layer on the roughened surface of the metal foil by chemical conversion treatment or the like. A surface of the cathode body 22 may be roughened, as needed.

(ii) Step of Fabricating Wound Body

The anode body 21 and the cathode body 22 are wound with the separator 23 interposed therebetween, to form a wound body. For the separator 23, a nonwoven fabric containing, as a primary component, a synthetic cellulose or the like can be used. The winding stop tape 24 is applied to the outer surface of the cathode body 22 located at the outermost layer of the wound body, to secure the end of the cathode body 22. The wound body may be further subjected to chemical conversion treatment, as needed.

(iii) Step of Forming Capacitor Element 10

For example, a polymer dispersion in a liquid form is impregnated into the dielectric layer, to form a film of the conductive polymer that covers at least part of the dielectric layer. This provides the capacitor element 10 in which a conductive polymer is disposed between the anode body 21 and the cathode body 22. The step of applying a polymer dispersion onto the surface of the dielectric layer may be repeated twice or more. Thereafter, a liquid component is impregnated into the capacitor element 10. This provides an electrolytic capacitor including a conductive polymer and a liquid component.

(iv) Step of Encapsulating Capacitor Element

The capacitor element 10 is housed, together with the liquid component, in the bottomed case 11, so that the lead wires 14A and 14B are positioned on the opening side of the bottomed case 11. Next, the opening of the bottomed case 11 is closed with the sealing member 12 having the lead wires 14A and 14B passing therethrough, and the open end is crimped onto the sealing member 12 to be curled, and the seat plate 13 is then placed on the curled portion. Thus, an electrolytic capacitor as illustrated in FIG. 1 is completed.

In the above embodiments, a wound electrolytic capacitor was described, but the scope of application of the present invention is not limited to the above, and can also be applied to other capacitors, for example, a chip-type electrolytic capacitor including a metal sintered body as the anode body, and a laminate-type electrolytic capacitor including a metal plate as the anode body.

EXAMPLES

The present invention will be more specifically described below with reference to Examples and Comparative Examples, but the present invention is not limited to the following Examples.

<<Production of Electrolytic Capacitors A1 to A35 and B1 to B5>>

A wound electrolytic capacitor (diameter 10 mm×L (length) 10 mm) having a rated voltage of 25 V and a rated capacitance of 330 μF was produced. A specific manufacturing method of the electrolytic capacitor will be described below.

(Preparation of Anode Body)

A 100-μm-thick aluminum foil was subjected to etching treatment, to roughen a surface of the aluminum foil. Thereafter, a dielectric layer was formed at the surface of the aluminum foil by chemical conversion treatment. The chemical conversion treatment was performed by immersing the aluminum foil in an ammonium adipate solution, and applying a voltage of 45 V thereto. Thereafter, the aluminum foil was cut, to prepare an anode body.

(Preparation of Cathode Body)

A 50-μm-thick aluminum foil was subjected to etching treatment, to roughen a surface of the aluminum foil. Thereafter, the aluminum foil was cut, to prepare a cathode body.

(Fabrication of Wound Body)

An anode lead tab and a cathode lead tab were connected to the anode body and the cathode body, respectively, and the anode body and the cathode body were wound, together with the lead tabs, with a separator interposed between the anode body and the cathode body. An anode lead wire and a cathode lead wire were respectively connected to the ends of the lead tabs extended from the wound body. The obtained wound body was subjected to chemical conversion treatment again, to form a dielectric layer on the cut end of the anode body. Next, the end of the outer surface of the wound body was secured with a winding stop tape, to complete the wound body.

(Preparation of Polymer Dispersion)

A mixed solution was prepared by dissolving 3,4-ethylenedioxythiophene and polystyrene sulfonic acid (PSS, weight average molecular weight: 100,000) serving as a polymer dopant, in ion-exchanged water. To the mixed solution, under stirring, iron(III) sulfate (oxidizing agent) dissolved in ion-exchanged water was added, to allow a polymerization reaction to proceed. Upon reaction, the obtained reaction solution was dialyzed, to remove unreacted monomers and excess oxidizing agent, so that a polymer dispersion including polyethylene dioxythiophene doped with about 5 mass % of PSS (PEDOT/PSS) was obtained.

(Formation of Conductive Polymer Layer)

In a reduced pressure atmosphere (40 kPa), the wound body was immersed in the polymer dispersion placed in a predetermined container for 5 minutes, and then, the wound body was pulled up from the polymer dispersion. Next, the wound body impregnated with the polymer dispersion was dried in a 150° C. drying oven for 20 minutes, to form a conductive polymer layer covering at least part of the dielectric layer. In this way, a capacitor element was formed.

(Preparation of Liquid Component)

The solvents as shown in Tables were prepared. At this time, as needed, a mixture of solvents were heated to 95° C. under stirring. To the prepared solvents, the acid component and the base component as shown in Tables were added so that the concentrations thereof in each liquid component reached as shown in Tables. In this way, liquid components were prepared.

(Assembly of Electrolytic Capacitor)

The above wound body with the conductive polymer layer formed thereon was immersed in the liquid component for 5 minutes in a reduced pressure atmosphere (40 kPa). In this way, a capacitor element impregnated with the liquid component was obtained. The resulting capacitor element was encapsulated, to complete an electrolytic capacitor as illustrated in FIG. 1. This was followed by aging treatment at 130° C. for 2 hours, under application of a rated voltage.

[Evaluation: Measurement of ESR and Leakage Current]

In a 20° C. environment, an ESR (initial ESR (Z0)) at a frequency of 100 kHz of the electrolytic capacitor was measured using an LCR meter for four-terminal measurement. In addition, in a 20° C. environment, a rated voltage was applied to the electrolytic capacitor, and a leakage current after a lapse of 2 minutes (initial leakage current L0) was measured.

Next, while a rated voltage was applied to the electrolytic capacitor in a 145° C. environment, the electrolytic capacitor was left to stand for 2000 hours. In a similar manner to the above for measuring the initial ESR and the leakage current, an ESR (Z1) and a leakage current (L1) of the electrolytic capacitor after left at 145° C. were measured in a 20° C. environment. As the percentage increase in ESR (AFSR), a ratio (Z1/Z0) of the ESR (Z1) of the electrolytic capacitor after left at 145° C. to the initial ESR (Z0) was determined. In addition, as the change in leakage current, a ratio (L1/L0) of the leakage current (L1) of the electrolytic capacitor after left at 145° C. to the initial value (L0) was determined.

The evaluation results are shown in Tables 1 to 4 below. In the tables, A1 to A35 are of Examples, and B1 to B5 are of Comparative Examples. In the tables, the ESR and the leakage current after left at 145° C. are denoted as ESR and leakage current after left at high temperature.

TABLE 1A

| | | Base component | | | Acid component | | Solvent |
|---|---|---|---|---|---|---|---|
| | Kind | pKa of conjugate acid | b.p. (° C.) | Concentration (mass %) | Kind | Concentration (mass %) | Kind, ratio by volume |
| B1 | aniline | 4.2 | 184 | 3.6 | phthalic acid | 6.4 | glycerin:PEG 300 = 30:70 |
| A1 | pyridine | 5 | 115 | 3.2 | | 6.8 | |
| A2 | hydroxyethylpyridine | 5.1 | 250 | 4.3 | | 5.7 | |
| A3 | N-methylmorpholine | 7.4 | 116 | 3.8 | | 6.2 | |
| A4 | N-butylmorpholine | 7.5 | 169 | 4.6 | | 5.4 | |
| A5 | triethanolamine | 7.8 | 360 | 4.7 | | 5.3 | |
| A6 | amine EO adduct | 8 | Without | 7.8 | | 2.2 | |
| A7 | triisobutylamine | 9.5 | 183 | 5.3 | | 4.7 | |
| B2 | dibutylamine | 11.3 | 159 | 4.4 | | 5.6 | |
| B3 | triethylamine | 10.7 | 90 | 3.8 | | 6.2 | |

PEG300: polyethylene glycol (Mw = 300)
amine EO adduct:

R = octadecyl, n + m = 7.4

TABLE 1B

| | Initial ESR (Z0) (mΩ) | ESR after left at high temperature (Z1) (Ω) | ΔESR Z1/Z0 | Initial leakage current (L0) (μA) | Leakage current after left at high temperature (L1) (μA) | Change in leakage current L1/L0 |
|---|---|---|---|---|---|---|
| B1 | 10 | 14 | 1.40 | 5.1 | 106 | 20.78 |
| A1 | 10 | 14 | 1.40 | 4.3 | 9.1 | 2.12 |
| A2 | 10 | 15 | 1.50 | 4.4 | 8.8 | 2.00 |
| A3 | 10 | 17 | 1.70 | 4.4 | 8.8 | 2.00 |
| A4 | 10 | 17 | 1.70 | 4.2 | 7.6 | 1.81 |
| A5 | 10 | 17 | 1.70 | 4.3 | 5.3 | 1.23 |

TABLE 1B-continued

| | Initial ESR (Z0) (mΩ) | ESR after left at high temperature (Z1) (Ω) | ΔESR Z1/Z0 | Initial leakage current (L0) (μA) | Leakage current after left at high temperature (L1) (μA) | Change in leakage current L1/L0 |
|---|---|---|---|---|---|---|
| A6 | 11 | 18 | 1.64 | 4.1 | 4.2 | 1.02 |
| A7 | 11 | 19 | 1.73 | 3.8 | 3.9 | 1.03 |
| B2 | 13 | 112 | 8.62 | 3.1 | 3.9 | 1.26 |
| B3 | 12 | 57 | 4.75 | 3.4 | 3.5 | 1.03 |

TABLE 2A

| | Base component | | | | Acid component | | |
|---|---|---|---|---|---|---|---|
| | Kind | pKa of conjugate acid | b.p. (°C.) | Concentration (mass %) | Kind | Concentration (mass %) | Solvent Kind, ratio by volume |
| A5 | triethanolamine | 7.8 | 360 | 4.7 | phthalic acid | 5.3 | glycerin:PEG300 = 30:70 |
| A8 | | 7.8 | 360 | 4.7 | | 5.3 | glycerin:PEG200 = 30:70 |
| A9 | | 7.8 | 360 | 4.7 | | 5.3 | glycerin:PEG400 = 30:70 |
| A10 | | 7.8 | 360 | 4.7 | | 5.3 | PEG300 = 100 |
| A11 | | 7.8 | 360 | 0.14 | | 0.16 | PEG300 = 100 |
| A12 | | 7.8 | 360 | 10.8 | | 12.2 | PEG300 = 100 |
| A13 | | 7.8 | 360 | 4.7 | | 5.3 | polyglycerin 310:PEG300 = 30:70 |
| A14 | | 7.8 | 360 | 4.7 | | 5.3 | mannitol EO adduct:PEG300 = 30:70 |
| A15 | | 7.8 | 360 | 4.7 | | 5.3 | EG |
| A16 | | 7.8 | 360 | 4.7 | | 5.3 | diethylene glycol |
| A17 | | 7.8 | 360 | 4.7 | | 5.3 | pentaerythritol:PEG300 = 30:70 |
| A18 | | 7.8 | 360 | 4.7 | | 5.3 | mannitol:PEG300 = 30:70 |
| B4 | triethanolamine | 7.8 | 360 | 4.7 | phthalic acid | 5.3 | γ-BL |

PEG300: polyethylene glycol (Mw = 300)
PEG200: polyethylene glycol (Mw = 200)
PEG400: polyethylene glycol (Mw = 400)
polyglycerin 310: polyglycerin with a number average molecular weight of about 310
mannitol EO adduct: mannitol ethylene oxide adduct
EG: ethylene glycol
γ-BL: γ-butyrolactone

TABLE 2B

| | Initial ESR (Z0) (mΩ) | ESR after left at high temperature (Z1) (Ω) | ΔESR Z1/Z0 | Initial leakage current (L0) (μA) | Leakage current after left at high temperature (L1) (μA) | Change in leakage current L1/L0 |
|---|---|---|---|---|---|---|
| A5 | 10 | 17 | 1.70 | 4.3 | 5.3 | 1.23 |
| A8 | 10 | 16 | 1.60 | 4.00 | 4.9 | 1.23 |
| A9 | 11 | 17 | 1.55 | 4.4 | 5.9 | 1.34 |
| A10 | 13 | 19 | 1.46 | 3.9 | 4.9 | 1.26 |
| A11 | 10 | 14 | 1.40 | 9.8 | 18.6 | 1.90 |
| A12 | 14 | 29 | 2.07 | 2.9 | 3.1 | 1.07 |
| A13 | 10 | 17 | 1.70 | 4.1 | 5.6 | 1.37 |
| A14 | 11 | 19 | 1.73 | 4.3 | 5.3 | 1.23 |
| A15 | 10 | 27 | 2.70 | 3.9 | 4.8 | 1.23 |
| A16 | 11 | 25 | 2.27 | 4.1 | 5.1 | 1.24 |
| A17 | 10 | 17 | 1.70 | 4.6 | 5.5 | 1.20 |
| A18 | 12 | 19 | 1.58 | 4.8 | 5.8 | 1.21 |
| B4 | 13 | 45 | 3.46 | 3.9 | 4.9 | 1.26 |

TABLE 3A

| | Base component | | | | Acid component | | |
|---|---|---|---|---|---|---|---|
| | Kind | pKa of conjugate acid | b.p. (° C.) | Concentration (mass %) | Kind | Concentration (mass %) | Solvent Kind, ratio by volume |
| A5 | triethanolamine | 7.8 | 360 | 4.7 | phthalic acid | 5.3 | glycerin:PEG 300 = 30:70 |
| A19 | | | | 3.4 | borodisalicylic acid | 6.6 | |
| A20 | | | | 4.8 | borodiglycolic acid | 5.2 | |
| A21 | | | | 4.5 | saccharin | 5.5 | |
| A22 | | | | 5.7 | squaric acid | 4.3 | |
| A23 | | | | 5.1 | Meldrum's acid | 4.9 | |
| A24 | amine EO adduct | 8 | Without | 6.7 | borodisalicylic acid | 3.3 | |

PEG300: polyethylene glycol (Mw = 300)
amine EO adduct:

R = octadecyl, n + m = 7.4

TABLE 3B

| | Initial ESR (Z0) (mΩ) | ESR after left at high temperature (Z1) (Ω) | ΔESR Z1/Z0 | Initial leakage current (L0) (μA) | Leakage current after left at high temperature (L1) (μA) | Change in leakage current L1/L0 |
|---|---|---|---|---|---|---|
| A5 | 10 | 17 | 1.70 | 4.3 | 5.3 | 1.23 |
| A19 | 9 | 14 | 1.56 | 4.1 | 4.8 | 1.17 |
| A20 | 9 | 16 | 1.78 | 4.9 | 5.6 | 1.14 |
| A21 | 11 | 19 | 1.73 | 4.6 | 5.5 | 1.20 |
| A22 | 11 | 21 | 1.91 | 4.4 | 5.1 | 1.16 |
| A23 | 11 | 19 | 1.73 | 4.7 | 5.5 | 1.17 |
| A24 | 10 | 15 | 1.50 | 4.9 | 5.7 | 1.16 |

TABLE 4A

| | Base component | | | | Acid component | | |
|---|---|---|---|---|---|---|---|
| | Kind | pKa of conjugate acid | b.p. (° C.) | Concentration (mass %) | Kind | Concentration (mass %) | Solvent Kind, ratio by volume |
| A3 | N-methylmorpholine | 7.4 | 116 | 3.8 | phthalic acid | 6.2 | glycerin:PEG300 = 30:70 |
| A25 | | 7.4 | 116 | 3.8 | | 6.2 | glycerin:PEG200 = 30:70 |
| A26 | | 7.4 | 116 | 3.8 | | 6.2 | glycerin:PEG400 = 30:70 |
| A27 | | 7.4 | 116 | 3.8 | | 6.2 | PEG300 = 100 |
| A28 | | 7.4 | 116 | 0.11 | | 0.19 | PEG300 = 100 |
| A29 | | 7.4 | 116 | 8.7 | | 14.3 | PEG300 = 100 |
| A30 | | 7.4 | 116 | 3.8 | | 6.2 | polyglycerin 310:PEG300 = 30:70 |
| A31 | | 7.4 | 116 | 3.8 | | 6.2 | mannitol EO adduct:PEG300 = 30:70 |
| A32 | | 7.4 | 116 | 3.8 | | 6.2 | EG |
| A33 | | 7.4 | 116 | 3.8 | | 6.2 | diethylene glycol |
| A34 | | 7.4 | 116 | 3.8 | | 6.2 | pentaerythritol:PEG300 = 30:70 |
| A35 | | 7.4 | 116 | 3.8 | | 6.2 | mannitol:PEG300 = 30:70 |
| B5 | N-methylmorpholine | 7.4 | 116 | 3.8 | phthalic acid | 6.2 | γ-BL |

PEG300: polyethylene glycol (Mw = 300)

PEG200: polyethylene glycol (Mw = 200)

PEG400: polyethylene glycol (Mw = 400)

polyglycerin 310: polyglycerin with a number average molecular weight of about 310 mannitol EO adduct: mannitol ethylene oxide adduct

EG: ethylene glycol

γ-BL: γ-butyrolactone

TABLE 4B

| | Initial ESR (Z0) (mΩ) | ESR after left at high temperature (Z1) (Ω) | ΔESR Z1/Z0 | Initial leakage current (L0) (μA) | Leakage current after left at high temperature (L1) (μA) | Change in leakage current L1/L0 |
|---|---|---|---|---|---|---|
| A3 | 10 | 17 | 1.70 | 4.4 | 8.8 | 2.00 |
| A25 | 9 | 15 | 1.67 | 4.5 | 5.3 | 1.18 |
| A26 | 10 | 15 | 1.50 | 4.6 | 5.5 | 1.20 |
| A27 | 13 | 16 | 1.23 | 4.0 | 5.2 | 1.30 |
| A28 | 8 | 12 | 1.50 | 7.3 | 10.4 | 1.42 |
| A29 | 13 | 27 | 2.08 | 3.1 | 3.5 | 1.13 |
| A30 | 10 | 16 | 1.60 | 4.1 | 5.3 | 1.29 |
| A31 | 12 | 16 | 1.33 | 4.4 | 5.3 | 1.20 |
| A32 | 9 | 25 | 2.78 | 4.0 | 4.9 | 1.23 |
| A33 | 10 | 24 | 2.40 | 3.9 | 5.4 | 1.38 |
| A34 | 10 | 15 | 1.50 | 4.3 | 5.2 | 1.21 |
| A35 | 11 | 17 | 1.55 | 4.8 | 5.6 | 1.17 |
| B5 | 11 | 40 | 3.64 | 4.2 | 5.0 | 1.19 |

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The electrolytic capacitor of the present disclosure is applicable as a hybrid electrolytic capacitor. The electrolytic capacitor is particularly suitable for applications that require excellent heat resistance. However, the use of the electrolytic capacitor is not limited thereto.

REFERENCE SIGNS LIST

10: capacitor element
11: bottomed case
12: sealing member
13: seat plate
14A, 14B: lead wire
15A, 15B: lead tab
21: anode body
22: cathode body
23: separator
24: winding stop tape

The invention claimed is:

1. An electrolytic capacitor, comprising:
a capacitor element; and
a liquid component, wherein:
the capacitor element includes an anode body having a dielectric layer at a surface of the anode body, and a conductive polymer component covering part of the dielectric layer,
the liquid component contains a first solvent, a base component, and an acid component,
the first solvent is at least one selected from the group consisting of a polyol and a derivative thereof,
the base component contains a first base which has no boiling point or a boiling point of 100° C. or higher,
a conjugate acid of the first base has an acid dissociation constant of 5 or more and 10 or less,
the first base includes at least N-alkylmorpholine,
in the N-alkylmorpholine, an alkyl group on a nitrogen atom of morpholine has 1 to 4 carbon atoms, and
a total concentration of the acid component and the base component in the liquid component is 0.1 mass % or more and 25 mass % or less.

2. The electrolytic capacitor according to claim 1, wherein the first base includes at least one first amine compound selected from the group consisting of an aliphatic amine, an alicyclic amine, and an aromatic amine.

3. The electrolytic capacitor according to claim 2, wherein the aliphatic amine is at least one selected from the group consisting of a trialkylamine having at least one $C_{4-20}$ alkyl group, a tertiary alkanolamine, and a polyalkylenepolyamine.

4. The electrolytic capacitor according to claim 1, wherein the first base includes a second amine compound having a polyalkylene oxide chain.

5. The electrolytic capacitor according to claim 1, wherein the first base has a boiling point of 150° C. or higher.

6. The electrolytic capacitor according to claim 1, wherein the first base has a melting point of 30° C. or lower.

7. The electrolytic capacitor according to claim 1, wherein the first solvent includes at least one selected from the group consisting of a polyhydroxyalkane component, a polyalkylene glycol component, a glycerin component, and a sugar alcohol component.

8. The electrolytic capacitor according to claim 1, wherein the first solvent includes a polyhydroxyalkane component which includes at least one selected from the group consisting of an alkylene glycol component and a trimethylolpropane.

9. The electrolytic capacitor according to claim 1, wherein the first solvent includes a polyalkylene glycol component having a weight average molecular weight of 150 or more.

10. The electrolytic capacitor according to claim 1, wherein the first solvent includes at least one selected from the group consisting of a polyhydroxyalkane component, a glycerin component, and a sugar alcohol component.

11. The electrolytic capacitor according to claim 1, wherein the first solvent includes a polyalkylene glycol component having a weight average molecular weight of 200 or more and 20,000 or less.

12. The electrolytic capacitor according to claim 1, wherein the first solvent includes a sugar alcohol component which includes at least one selected from the group consisting of mannitol, sorbitol, erythritol, pentaerythritol, and derivatives thereof.

13. The electrolytic capacitor according to claim 1, wherein the acid component includes an aromatic carboxylic acid.

14. The electrolytic capacitor according to claim 1, wherein the acid component includes a coordination compound including at least one central atom selected from the group consisting of boron, aluminum, and silicon, and an organic molecule having a plurality of ligand atoms bonded to the central atom, and the plurality of ligand atoms are at least one selected from the group consisting of an oxygen atom and a nitrogen atom.

15. The electrolytic capacitor according to claim 14, wherein the coordination compound includes at least one selected from the group consisting of borodisalicylic acid, borodioxalic acid, borodiglycolic acid, borodicatechol, borodipyrogallol, borodigallic acid, and borodigallic acid alkyl ester.

16. The electrolytic capacitor according to claim 1, wherein the acid dissociation constant of the conjugated acid is 5 or more and 8 or less.

17. The electrolytic capacitor according to claim 1, wherein the acid component includes at least one selected from the group consisting of saccharin, oxocarbonic acid, Meldrum's acid, and picric acid.

18. The electrolytic capacitor according to claim 1, wherein the acid component includes an acid having an acid dissociation constant of 2 or more and 5 or less.

19. The electrolytic capacitor according to claim 1, wherein a content of the first solvent in the liquid component is 5 mass % or more.

20. The electrolytic capacitor according to claim 1, wherein a molar ratio of the acid component to the base component (=acid component/base component) is 0.1 or more and 50 or less.

21. The electrolytic capacitor according to claim 1, wherein pH of the liquid component is 4 or less.

* * * * *